Feb. 21, 1933.

A. LOWNDES

CENTRIFUGAL CLUTCH

Re. 18,741

Original Filed Dec. 29, 1927

*Inventor*

ARTHUR LOWNDES

By Frederick B. Bromley

Attorney.

Reissued Feb. 21, 1933 Re. 18,741

UNITED STATES PATENT OFFICE

ARTHUR LOWNDES, OF TORONTO, ONTARIO, CANADA

CENTRIFUGAL CLUTCH

Original No. 1,745,681, dated February 4, 1930, Serial No. 243,342, filed December 29, 1927. Application for reissue filed January 25, 1932. Serial No. 588,686.

The invention relates to improvements in centrifugal clutches as described in the present specification and shown in the drawing which form part of the same.

The invention appertains primarily to centrifugal clutches of the class employed for the purpose of gradually applying the load to a prime mover, such as an induction motor, as it is started. As is well known, it is imperative that some form of intermediary be used in conjunction with a motor of this nature in order to slowly apply the load and thus avoid consequent detrimental results. This clutch therefore has been designed chiefly with a view to producing a more efficacious and serviceable device for the purpose aforementioned, although it is capable of general application in the transmission of power where it is necessary to relieve jar and strain incidental to the sudden picking up of a load.

The salient feature of the invention resides in the provision of friction shoes interfitted one with another so as to advance and recede in unison.

This maintains the balance of the clutch at all times. Furthermore it results in a smoother running and quieter operating clutch which is highly desirable for certain capacities such as in household appliances.

In carrying out this invention, a ring is composed of segmental centrifugal members, or shoes, the centre of which is concentric with the clutch axis as also is the centre of gravity. The centrifugal members on account of their symmetry do not shift the centre of gravity as they advance radially under centrifugal force for applying clutching pressure. The means for causing the centrifugal members to move in unison consists of elements forming an interfitting connection between the members that only allows them to have relative uniform movement.

In the preferred embodiment of the invention the interfitting elements consist of projections integral with or secured to the centrifugal members and engaged in slots provided in the members. Each member has a projection extending from one of its abutting faces so as to engage in a slotted portion of the adjacent abutting face of the adjoining member. The ring of centrifugal members is faced with a friction lining that consists of individual lengths, one for each member so that it is pressed thereby into clutching contact with the driven member.

A distinctive advantage accruing from the ring formation of the centrifugal members is that the maximum potential area of clutch face is utilized for a given size of clutch. Furthermore the greater weight of the centrifugal members results in the transmission of high torque at comparatively low speeds.

Referring to the drawing: Figure 1 is a vertical section through the clutch, taken axially.

Like numerals of reference indicate corresponding parts in each of the figures throughout the drawing.

Figure 1:
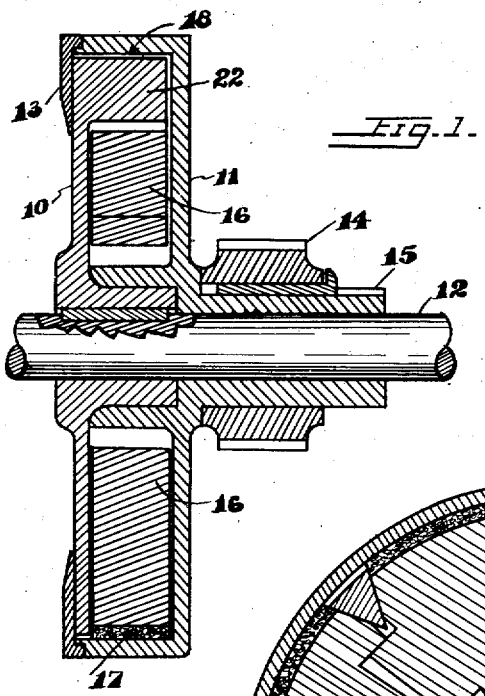
Figure 2:
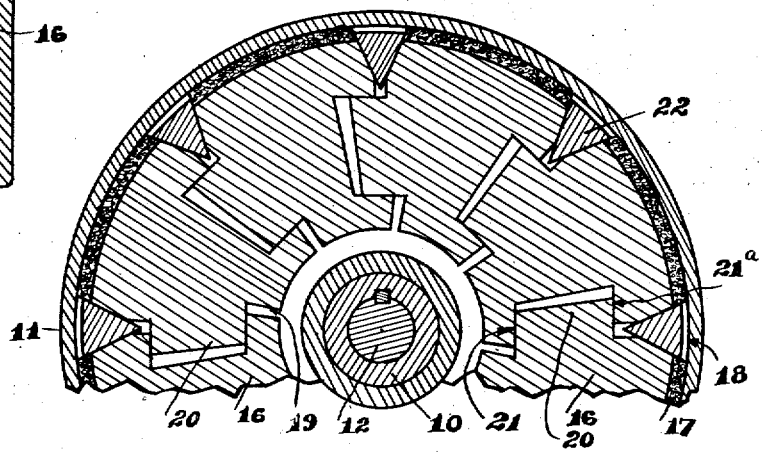
Figure 2 is a section taken at right angles to the axis and depicting the major portion of the lower half broken away. In this view the shoes are shown expanded.

In the drawing, the reference numeral 10 denotes generally the driving member of the clutch and 11 the driven member hereinafter referred to as "the drum".

The driving member is keyed or otherwise secured to the shaft 12 which extends as usual from the prime mover or other source of power transmission. The drum is mounted for independent rotation on the shaft and is retained against axial movement in the present instance by a ring 13 bolted to the drum and shouldered against the driving member, although it is to be understood that other means may be employed for this end. The drum carries a spur-gear 14 or other means for taking off power, which gear is fastened to the boss 15.

The centrifugal members or shoes 16 are disposed between the driving member and the drum, and are free to move radially outwardly under centrifugal action. Each shoe is a segment of a ring and is faced with a lining, as at 17, for engagement with the interior polished surface 18 of the drum. The linings are applied to the outer faces of the shoes and may be of conventional material preferably soaked in oil.

Figure 3:
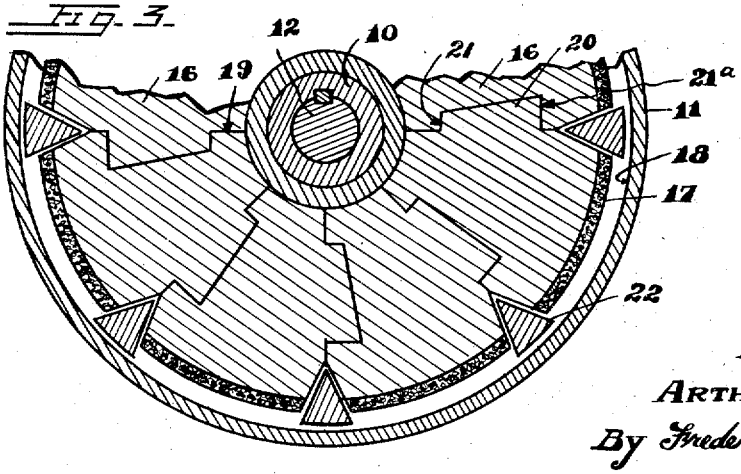
Figure 3 is a similar section, but showing the top portion broken away. In this view the shoes are illustrated as contracted or free.

The radial faces 19 of the segmental shoes interfit by means of the provision of projections 20 integral with one of these faces of each shoe; which projections are engaged with recesses supplied in the adjoining faces respectively of the adjacent shoes. This constitutes an interlocking structure that assumes the configuration of a ring when constructed as shown in Fig. 3. This ring, however, expands freely under centrifugal force and the component segments advance uniformly into engagement with the drum.

It is preferable, but not essential, to make the projections and recesses with substantially rectangular sides 21 and 21*a* perpendicular to radial lines.

Integral with or secured to the driving member is a number of circumposed driving dogs 22, there being one located at each juncture of the shoes near the periphery thereof. Each dog is wedge-shaped, the apex of the wedge in each case pointing towards the axis of rotation. The shoes are cut away to allow for the dogs. These dogs abut the shoes and linings as depicted in the drawing and form a positive connection with the driving member.

The sides 21*a* of the projections are disposed at a lesser distance from the dogs 22 than the thickness of the lining so that in the event of the lining wearing excessively these sides will encounter the dogs before the periphery of the shoes rub against the drum, thus preventing scoring the latter.

It will be manifest from the preceding description that the driving member carries the dogs around with it and as the linings are positively engaged therewith they too are carried around it at the same time. In the starting of the clutch the centrifugal members acquire sufficient force to spread them outwardly so as to press against the linings. As the clutch is accelerated the centrifugal members apply sufficient pressure to throw in the clutch.

What I claim is:—

1. A centrifugal clutch comprising a driving member, a drum constituting a driven member, a complement of friction shoes carried by the driving member and having interfitting means to enable them to advance and recede in unison, and driving means borne by the driving member but not physically connected to the shoes.

2. A centrifugal clutch comprising a driving member, a drum constituting a driven member, a complement of friction shoes each of which is a segment of a ring that encircles the axis of rotation, the component shoes functioning to preclude displacement of each other, said shoes being designed to interfit to enable them to advance and recede in unison and driving means therefor borne by the driven member but not physically connected to the shoes.

3. In a centrifugal clutch, a driving member, a driven member, a complement of centrifugal members for applying clutching pressure, said centrifugal members composing a ring around the axis of rotation when contracted and adapted to fly outwardly in segments under the influence of centrifugal force, the individual segmental members being interconnected so as to have uniform expansile action, and means for inducing rotation of said segmental members, said means being separate and distinct from the interconnection between the segmental members, and being free of physical connection with said segmental members.

4. In a centrifugal clutch, a driving member, a driven member, a complement of centrifugal members for applying clutching pressure, means for urging the centrifugal members to rotate, said means being carried by the driving member but not physically connected to the centrifugal members and interfitting means incorporated in the centrifugal members to enable them to advance and recede in unison.

5. In a centrifugal clutch, a driving member, a driven member, a complement of centrifugal members for applying clutching pressure and having slots therein, projections carried by the centrifugal members and engaged in said slots to enable the members to advance and recede in unison, and means for urging the centrifugal members to rotate with the driving member said means being characterized in that it is free of physical connection with the centrifugal members.

6. In a centrifugal clutch, a driving member, a drum constituting a driven member, a complement of centrifugal members each of which is of a segmental character disposed about the axis of rotation, linings providing circumferentially arranged facings for around the centrifugal members, means for revolving the centrifugal members but not physically connected thereto, and means interconnecting the centrifugal members to enable them to advance and recede in unison.

7. In a centrifugal clutch, a driving member, a drum constituting a driven member, a complement of centrifugal members each of which is of a segmental character disposed about the axis of rotation, linings circumferentially arranged around the centrifugal members, means carried by the driving member for rotating the centrifugal members but not physically connected thereto, and means interconnecting the centrifugal members to enable them to advance and recede in unison.

8. A centrifugal clutch comprising a driving member, a drum constituting a driven member, a complement of friction shoes carried by the driving member and having interfitting means to enable them to advance and recede in unison, and driving dogs borne by the driving member but not physically connected to the shoes.

9. A centrifugal clutch comprising a driving member, a drum constituting a driven member, a complement of friction shoes each of which is a segment of a ring that encircles the axis of rotation, the component segmental shoes functioning to preclude displacement of each other, said shoes being designed to interfit to enable them to advance and recede in unison, and dogs borne by the driving member but not physically connected to the shoes.

10. In a centrifugal clutch, a driving member, a driven member, a complement of metallic shoes, linings affixed to the shoes, interfitting elements borne by the shoes to enable them to advance and recede in unison, and dogs carried by the driving member for precluding independent rotation of the shoes, said dogs also functioning to constrain the outward movement of the shoes to prevent them coming in contact with the driving member when the linings are worn excessively.

11. In a centrifugal clutch, a driving member, a driven member, a complement of metallic shoes, linings affixed to the shoes, interfitting elements borne by the shoes to enable them to advance and recede in unison, and dogs carried by the driving member for precluding independent rotation of the shoes, said dogs being constructed and arranged to cooperate with the interfitting elements for the purpose of preventing the shoes from contacting with the driving member when the linings are excessively worn.

12. In a centrifugal clutch, a driving member, a driven member in drum form having an interior annular clutch surface, a complement of friction shoes loosely disposed for outward movement under centrifugal force, said shoes being segments of a ring, interfitting projections and recesses provided on the adjoining faces of the shoes to enable them to advance and recede in unison, linings affixed to the shoes, and dogs located at the adjoining faces of the shoes and arranged to engage the projections thereof at a slightly lesser distance than the thickness of the linings to prevent said shoes from contacting with the clutch surface of the drum when the said linings are excessively worn.

Signed at Toronto, Ontario, Canada, this 21st day of January 1932.

ARTHUR LOWNDES.